(12) United States Patent
Li

(10) Patent No.: US 9,551,826 B2
(45) Date of Patent: Jan. 24, 2017

(54) LCD WITH BACKLIGHT MODULE HAVING QUANTUM DOT UNIT AND FRAME

(71) Applicant: SHENZHEN CHINA STAR OPTOELECTRONICS TECHNOLOGY CO., LTD., Shenzhen, Guangdong (CN)

(72) Inventor: Quan Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 280 days.

(21) Appl. No.: 14/375,671

(22) PCT Filed: Mar. 10, 2014

(86) PCT No.: PCT/CN2014/073153
§ 371 (c)(1),
(2) Date: Jul. 30, 2014

(87) PCT Pub. No.: WO2015/109637
PCT Pub. Date: Jul. 30, 2015

(65) Prior Publication Data
US 2015/0212260 A1 Jul. 30, 2015

(30) Foreign Application Priority Data
Jan. 27, 2014 (CN) .......................... 2014 1 0041189

(51) Int. Cl.
*G02F 1/13357* (2006.01)
*G09F 13/18* (2006.01)
(Continued)

(52) U.S. Cl.
CPC ........... *G02B 6/0086* (2013.01); *G02B 6/0026* (2013.01); *G02B 6/0085* (2013.01); *G02F 1/1336* (2013.01); *G02F 2001/133628* (2013.01)

(58) Field of Classification Search
CPC .............. G02F 1/1336; G02F 1/133608; G09F 2013/0445; G09F 2013/049; G09F 2013/1881
See application file for complete search history.

(56) References Cited

U.S. PATENT DOCUMENTS 8,573,827 B2 * 11/2013 Lee ...................... G02B 6/0023
362/609
9,052,541 B2 * 6/2015 Wang ................ G02F 1/133308
(Continued)

FOREIGN PATENT DOCUMENTS

CN 102819131 A 12/2012
CN 102878481 A 1/2013
(Continued)

OTHER PUBLICATIONS

International Search Report and Written Opinion dated Mar. 10, 2014, issued to International Application No. PCT/CN2014/073153.

*Primary Examiner* — Ismael Negron
(74) *Attorney, Agent, or Firm* — Stein IP, LLC

(57) ABSTRACT

The backlight module includes a front frame, a backboard, a heat sink, a light source and a light guide plate. A quantum dot unit is arranged between the light guide plate and the light source. The heat sink, light source and light guide plate are arranged on the backboard, with the heat sink fixing the quantum dot unit to the backboard. The backlight module further includes a middle frame arranged between the backboard and the front frame, and coupled to the heat sink.

14 Claims, 2 Drawing Sheets

(51) Int. Cl.
*F21V 8/00* (2006.01)
*G02F 1/1335* (2006.01)

(56) References Cited

U.S. PATENT DOCUMENTS

| | | | |
|---|---|---|---|
| 9,201,189 B2 * | 12/2015 | Lee | G02B 6/0021 |
| 9,360,614 B2 * | 6/2016 | Lee | G02B 6/0023 |
| 2012/0257136 A1 | 10/2012 | Horiuchi | 349/58 |
| 2014/0009820 A1 * | 1/2014 | Park | G02F 1/353 |
| | | | 359/326 |
| 2014/0029298 A1 * | 1/2014 | Hyun | G02B 6/0003 |
| | | | 362/608 |
| 2015/0160401 A1 * | 6/2015 | Namekata | G02F 1/1336 |
| | | | 349/65 |
| 2015/0205036 A1 * | 7/2015 | Shimizu | H04N 5/66 |
| | | | 348/790 |
| 2015/0338064 A1 * | 11/2015 | Ishino | G02F 1/133615 |
| | | | 349/61 |
| 2015/0355400 A1 * | 12/2015 | Li | F21K 9/52 |
| | | | 349/62 |

FOREIGN PATENT DOCUMENTS

| | | |
|---|---|---|
| CN | 102954408 A | 3/2013 |
| CN | 103104868 A | 5/2013 |

* cited by examiner

LCD WITH BACKLIGHT MODULE HAVING QUANTUM DOT UNIT AND FRAME

FIELD OF THE INVENTION

The present disclosure relates to a backlight module and a liquid crystal display using the backlight module.

BACKGROUND OF THE INVENTION

Recently, a quantum dot type light emitting diode has got more and more attention in the field of liquid crystal display. By adopting the quantum dot type light emitting diode as a backlight source, the color purity of a liquid crystal panel can be improved, and meanwhile the color density of a color filter does not need to be strengthened, so that the power consumption of the liquid crystal panel will not be increased. Additionally, the color gamut of the liquid crystal panel will expand accordingly, for example, can be increased by about 30%. Furthermore, by changing the size of a quantum dot, the emission wavelength of the quantum dot type light emitting diode can also be controlled.

FIG. 5 shows a sectional view of a liquid crystal display using a quantum dot type light emitting diode as a backlight according to prior art. As shown in FIG. 5, the liquid crystal display 80 mainly includes a backboard 81, and a light guide plate 82 and a backlight 83, which are both arranged in the backboard 81. A quantum dot unit 84 is arranged between the light guide plate 82 and the backlight 83. Light from the backlight 83 enters the light guide plate 82 after passing through the quantum dot unit 84. The quantum dot unit 84 is positioned by a heat sink 85 fixed on the backboard 81. The liquid crystal display 80 further includes a front frame 86 and a middle frame 87, which mutually cooperate for clamping a liquid crystal panel 89, wherein the middle frame 87 is provided with a transverse part 87*a* used for positioning the rear surface of the liquid crystal panel 89, and a lateral part 87*b*, which is vertical to the transverse part 87*a* and is extended from the inner side of the front frame 86 to the bottom wall of the backboard 81 along a front-to-back direction. The lateral part 87*b* can be cooperatively assembled with the backboard 81 through such connecting elements as a hook (not shown) or the like, in order to position the middle frame 87.

At present, for the liquid crystal display, an ultra-narrow frame is a fashionable pursuit. As a means of achieving the ultra-narrow frame, the frame of the backlight module is also required to be as narrow as possible in design. In order to achieve the narrow frame, the front frame can be narrowed. However, this can only narrow the frame of the liquid crystal display to a small extent, and is possible to result in weakening the mechanical strength of the entire backlight module. In addition, the narrow frame can also be achieved by decreasing the thickness of the side wall of the heat sink, but this will affect the heat dissipation effect of the liquid crystal display.

Thus, a technical solution is needed, which can greatly narrow the frame without resulting in other problems of the liquid crystal display.

SUMMARY OF THE INVENTION

Aiming at the above-mentioned technical problems in the prior art, the present disclosure provides a backlight module, which can narrow the frame of a liquid crystal display without resulting in other problems of the liquid crystal display. The present disclosure further relates to a liquid crystal display using the backlight module.

1) According to one aspect of the present disclosure, a backlight module is provided, including a front frame, a backboard, and a light guide plate and a backlight, which are both arranged in the backboard, a quantum dot unit being arranged between the light guide plate and the backlight, and the quantum dot unit being positioned by a heat sink fixed on the backboard, wherein the backlight module further includes a middle frame arranged between the backboard and the front frame and forming a positioning connection with the heat sink.

In the backlight module of the present disclosure, the middle frame is cooperatively connected with the heat sink, to achieve a positioning assembly of the middle frame. Therefore, the lateral part of the middle frame in the prior art can be eliminated, so as to fulfill the objective of greatly narrowing the frame of the liquid crystal display.

2) In one embodiment of item 1) of the present disclosure, the middle frame is T-shaped, and includes a first part in contact with the front end wall of the heat sink and used for positioning the panel, and a second part in contact with the outer side wall of the heat sink and the inner side wall of the front frame, wherein the rear end wall of the second part of the middle frame is abutted against the front end wall of the backboard. By adopting the middle frame having such structure, the integral structure of the backlight module is compact, and the mechanical property thereof is good.

3) In one embodiment of item 2) of the present disclosure, a groove open outwards is arranged on the outer side wall of the heat sink, for holding a projection arranged on the second part of the middle frame and protruding inwards, in order to form a positioning connection between the middle frame and the heat sink. Therefore, the engagement between the heat sink and the middle frame has a simple structure, and the main body structure of the heat sink does not need to be greatly changed, thereby facilitating the production.

4) In one embodiment of item 3) of the present disclosure, the groove is divided into a plurality of parts, not communicated with each other, in a direction parallel to the longitudinal direction of the middle frame. In this arrangement, the groove is divided into a plurality of separated parts, such that the middle frame can be better positioned. In addition, in actual production, the heat sink can be generally composed of a plurality of spliced elements along the longitudinal direction. Therefore, a separated groove part can be provided on each spliced element, thereby facilitating the production of the groove.

5) In one embodiment of item 4) of the present disclosure, the lengths of the parts of the grooves are set to be 1-3 cm.

6) In one embodiment of item 2) of the present disclosure, a hook is arranged on the front end wall of the heat sink, and a clamping slot capable of being matched with the hook is arranged on the first part of the middle frame. In an assembly state, the hook extends through the clamping slot associated therewith, and is mutually clamped with the clamping slot, so that the middle frame can be firmly engaged with the heat sink.

7) In one embodiment of item 6) of the present disclosure, the hook is completely accommodated in the clamping slot of the middle frame. Therefore, the hook does not protrude out of the front end face of the first part of the middle frame, thereby ensuring the hook to generate no influence on the assembly of the liquid crystal display. The safety of the backlight module and the liquid crystal display using the backlight module is improved.

8) In one embodiment of item 2) of the present disclosure, the first part of the middle frame is connected with the front end wall of the heat sink through a fastening screw.

9) In one embodiment of item 8) of the present disclosure, the screw is completely held between the front end face of the first part of the middle frame and the rear end face of the front end wall of the heat sink. In one specific example, a counter bore can be arranged on the first part of the middle frame, and a screw cap is arranged in the counter bore in a manner of not protruding from the front end face of the first part of the middle frame, so as not to affect the assembly of the liquid crystal display. Meanwhile, the threaded part of the screw does not protrude from the rear end face of the front end wall of the heat sink, thereby generating no influence on the installation of the quantum dot unit. Therefore, this arrangement improves the safety of the backlight module and the liquid crystal display using the backlight module.

10) According to a second aspect of the present disclosure, a liquid crystal display including the above-mentioned backlight module is provided, wherein a liquid crystal panel is clamped between the front frame and the middle frame.

Compared with the prior art, the present disclosure has the advantages that, the middle frame is positioned by the heat sink, and the arrangement of such structures as a hook and the like on the lateral part of the middle frame for cooperatively assembling the middle frame with the backboard is avoided. Thus, the lateral part of the middle frame can be eliminated, so that the objective of greatly narrowing the frame of the liquid crystal display can be fulfilled. Meanwhile, the influence on heat dissipation performance of the backlight module is small. In addition, the backlight module of the present disclosure is simple in structure, and is convenient to assemble.

BRIEF DESCRIPTION OF THE DRAWINGS

Preferred embodiments of the present disclosure will be described in detail below in combination with accompanying drawings, in which.

In the accompanying drawings, the same components are indicated by the same reference signs. The accompanying drawings are not drawn to actual scale.

DETAILED DESCRIPTION OF THE EMBODIMENTS

The present disclosure will be further illustrated below in conjunction with the accompanying drawings.

Figure 1:
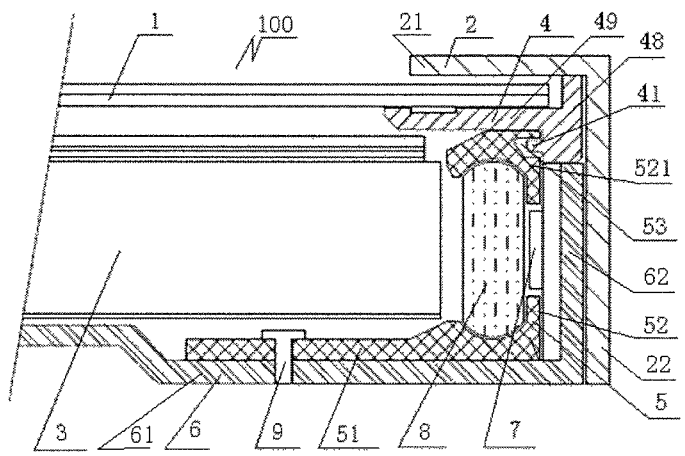
FIG. 1 shows a cross sectional view of a liquid crystal display according to a first embodiment of the present disclosure.

FIG. 1 schematically shows a sectional view of a liquid crystal display 100 according to a first embodiment of the present disclosure. As shown in the figure, the liquid crystal display 100 includes a panel 1 and a backlight module. It should be understood that, the liquid crystal display 100 further includes other components, and these components and assembly structures thereof are well known to those skilled in the art. For simplicity, they will not be repeated redundantly herein.

As shown in FIG. 1, the backlight module includes a backboard 6, and a light guide plate 3 and a backlight 7, which are both arranged in the backboard 6. The backboard 6 includes a bottom 61 and a lateral part 62. The backlight 7 is arranged outside the light guide plate 3 but inside the lateral part 62 of the backboard 6. A quantum dot unit 8 is arranged between the backlight 7 and the light guide plate 3. In this way, light emitted by the backlight 7 enters the light guide plate 3 after passing through the quantum dot unit 8, thus illuminating the panel 1.

A heat sink 5 is arranged on the periphery of the quantum dot unit 8. In one embodiment, the heat sink 5 can be made from an aluminum profile. The heat sink 5 is structured to be approximately L-shaped, with a long side part 51 thereof extending between the light guide plate 3 and the backboard 6 and is fixedly connected with the backboard 6 through a bolt 9, for example. A short side part 52 of the heat sink 5 is vertical to the long side part 51, and the backlight 7 is arranged within an opening of the short side part 52. The free end of the short side part 52 of the heat sink 5 extends towards the light guide plate 3 in a direction approximately parallel to the long side part 51, so as to form a front end wall 521. In this way, the quantum dot unit 8 is held in a space formed by the long side part 51, the short side part 52 and the front end wall 521 of the heat sink 5.

The backlight module further includes a front frame 2 and a middle frame 4. The front frame 2 and the middle frame 4 mutually cooperate to fixedly hold the panel 1. Specifically, the front frame 2 is structured as an L-shaped member, and includes a front part 21 located in front of the panel 1 and a lateral part 22 located on the outermost side of an entire liquid crystal display 10. The middle frame 4 is structured to be approximately T-shaped, and includes a first part 49 extending approximately parallel to the front part 21 of the front frame 2 and a second part 48 extending approximately parallel to the lateral part 22 of the front frame 2, wherein the front part 21 of the front frame 2 and the first part 49 of the middle frame 4 are respectively located on the front and back sides of the panel 1 to clamp the panel 1 therebetween, so as to position the panel 1.

According to the present disclosure, the second part 48 of the middle frame 4 is arranged in such a manner that one end thereof is abutted against the front part 21 of the front frame 2 and the other end thereof is abutted against the lateral part 62 of the backboard 6. In this way, the middle frame 4 of the backlight module according to the present disclosure is provided with no lateral part of the middle frame as in the prior art. By means of which, the frame of the liquid crystal display 100 is greatly narrowed, thus a narrow-frame liquid crystal display can be provided.

As shown in FIG. 1, according to the present disclosure, a projection 41 protruding inwards is arranged on the second part 48 of the middle frame 4. Correspondingly, a groove 53 open outwards is arranged on the side wall 52 of the heat sink 5. The projection 41 of the middle frame 4 can extend into the groove 53 of the heat sink, in order to form a positioning connection between the middle frame 4 and the heat sink 5. Therefore, good positioning of the middle frame 4 is achieved. That is to say, with the middle frame of the backlight module according to the present disclosure, not only a narrow frame structure can be achieved, but also the good positioning of the middle frame can be still ensured.

It is easy to understand that, in an embodiment not shown, a projection protruding outwards is arranged on the side wall 52 of the heat sink 5, and a groove open inwards and capable of holding the projection is arranged on the second part 48 of the middle frame 4. This can achieve the good positioning of the middle frame.

In order to better position the middle frame 4, the groove 53 can be configured to be divided into a plurality of parts, not communicated with each other, in a direction parallel to the longitudinal direction of the middle frame 4. In actual assembly, the heat sink 5 can be generally structured to include a plurality of heat dissipation elements which are arranged along the longitudinal direction and spliced together. In this way, the heat dissipation elements can be provided with respective groove parts. Therefore, such a plurality of separated parts each having a groove is very favorable to actual processing production. Preferably, the length (namely, size in the longitudinal direction of the middle frame 4) of each groove is set to be 1-3 cm. By means of this arrangement of the grooves, the assembly is convenient, and moreover the entire backlight module can be ensured to have good mechanical properties.

Figure 2:
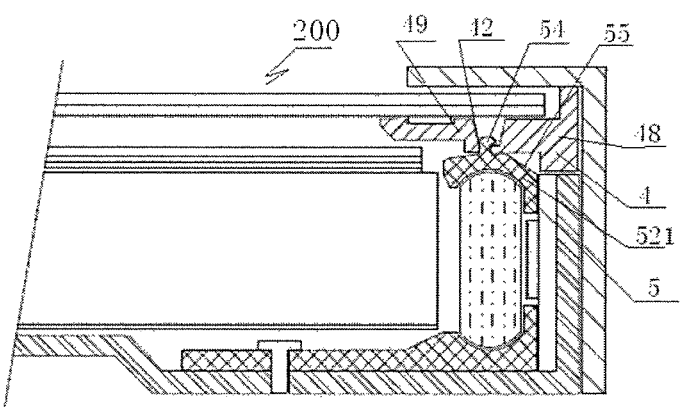
FIG. 2 shows a cross sectional view of a liquid crystal display according to a second embodiment of the present disclosure.

FIG. 2 schematically shows a sectional view of a liquid crystal display 200 according to a second embodiment of the present disclosure. For simplicity, the structures of the liquid crystal display 200 according to the second embodiment of the present disclosure that are the same as those of the liquid crystal display 100 of the first embodiment will not be illustrated in detail below, and merely the differences therebetween are introduced.

As shown in FIG. 2, no cooperative member is arranged on the second part 48 of the middle frame 4. On the contrary, a hook 54 is arranged on the front end wall 521 of the side wall 52 of the heat sink 5. Correspondingly, a clamping slot 42 capable of holding and hooking the hook 54 is arranged on the first part 49 of the middle frame 4. Therefore, the hook 54 of the heat sink 5 is clamped in the clamping slot 42 of the middle frame 4, in order to form a positioning connection between the middle frame 4 and the heat sink 5.

Figure 3:
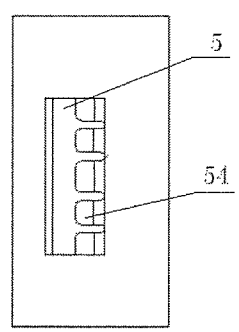
FIG. 3 shows a top view of a clamping slot in a middle frame according to a second embodiment of the present disclosure.

In one embodiment, a plurality of clamping slots 42 can be arranged on the first part 49 of the middle frame 4 along the longitudinal direction of the middle frame 4 to form a clamping slot group. For example, the clamping slot group can be formed through five clamping slots 42 arranged adjacently and distributed uniformly. Correspondingly, a corresponding number of hooks 54 matched with the clamping slots 42 are also arranged on the heat sink 5, as shown in FIG. 3. In this way, the workload of processing the clamping slots 42 and the hooks 54 is reduced, and the objective of saving the processing cost is satisfied. Meanwhile, by means of the arrangement, the assembly is convenient and the application requirements are satisfied.

As shown in FIG. 2, the hook 54 is arranged to be completely accommodated in the clamping slot 42 of the middle frame 4. That is to say, the hook 54 will not protrude from the front end face of the first part 49 of the middle frame 4. In this manner, it is ensured that the hook 54 can not affect the installation and positioning of a liquid crystal panel 1. Consequently, the safety of the backlight module and the liquid crystal display 100 using the backlight module is improved.

In addition, as shown in FIG. 2, a chamfer 55 is arranged at the corner connecting the second part 48 and the first part 49 of the middle frame 4 on the heat sink 5. Due to the chamfer 55, the installation of the middle frame 4 is facilitated, and the mutual cooperation of the clamping slot 42 of the middle frame 4 and the hook 54 of the heat sink 5 is ensured.

Figure 4:
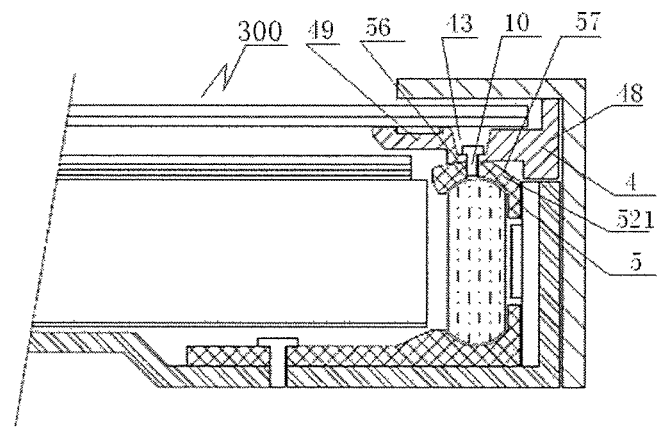
FIG. 4 shows a cross sectional view of a liquid crystal display according to a third embodiment of the present disclosure.
Figure 5:
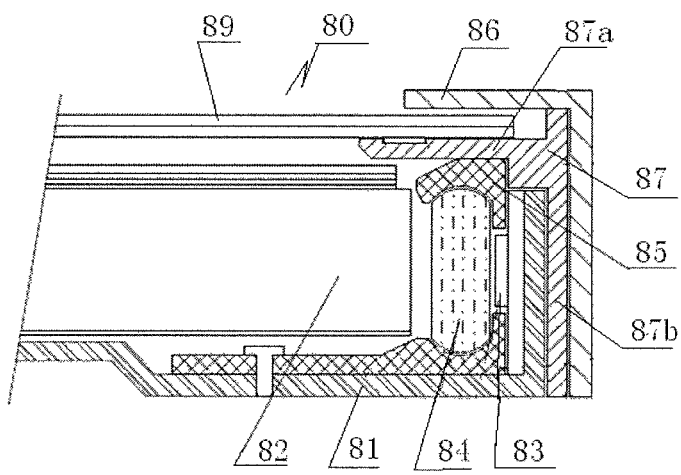
FIG. 5 shows a cross sectional view of a liquid crystal display in the prior art.

FIG. 4 schematically shows a sectional view of a liquid crystal display 300 according to a third embodiment of the present disclosure. In the embodiment, the middle frame 4 is fixedly connected with the heat sink 5 through a fastening screw 10. Specifically, a counter bore 43 is arranged on the first part 49 of the middle frame 4, and a threaded hole 56 corresponding to the counter bore 43 is arranged on the front end wall 521 of the side wall 52 of the heat sink 5. Under an assembly state, a screw 10 is screwed in the threaded hole 56 by penetrating through the counter bore 43, so as to fix the middle frame 4 with the heat sink 5 together. The screw cap part of the fastening screw 10 is completely located in the front end face of the first part 49 of the middle frame 4, namely, will not protrude from the front end face of the first part 49 of the middle frame 4. Therefore, the arrangement of the fastening screw 10 will not affect the installation of the panel 1, such that the safety of the backlight module and the liquid crystal display 100 using the backlight module is improved.

In addition, the threaded part of the fastening screw 10 is completely located within the threaded hole 56 of the heat sink 5. That is to say, the threaded part of the fastening screw 10 will not protrude from the rear end face of the front end wall 521 of the heat sink 5, thereby generating no influence on the installation of the quantum dot unit 8.

In one embodiment not shown, at least two screws 10 can be uniformly distributed in the longitudinal direction of the first part 49 of the middle frame 4 at intervals. For a large-size backlight module, to achieve better mechanical properties, a plurality of screws 10 are uniformly distributed in the longitudinal direction of the first part 49 of the middle frame 4 at intervals of 80-100 mm.

Similar to FIG. 2, for facilitating installation and better contact of the middle frame 4 and the heat sink 5, a chamfer 57 is arranged at the corner connecting the second part 48 and the first part 49 of the middle frame 4 on the heat sink 5.

By arranging the middle frame of the backlight module according to the present disclosure, the narrow frame structure can be achieved while ensuring the good positioning of the middle frame. This middle frame is simple in structure, low in production cost and convenient to assemble.

The foregoing descriptions are merely specific embodiments of the present disclosure, however, the protection scope of the present disclosure is not limited thereto. Any one skilled who is familiar with this art could readily think of variations or substitutions within the disclosed technical scope of the present disclosure, and these variations or substitutions shall fall within the protection scope of the present disclosure. Accordingly, the protection scope of the claims should prevail over the protection scope of the present disclosure.

The invention claimed is:
1. A backlight module comprising:
a middle frame; and
a backboard including a light guide plate, heat sink, a quantum dot unit, and a light source arranged in the backboard,
wherein the quantum dot unit is fixed to the backboard by the heat sink between the light source and light guide plate, and the middle frame is positioned between the backboard and the front frame, and coupled to the heat sink, the middle frame is T-shaped, and includes a first part in contact with a front end wall of the heat sink and capable of providing support for a display panel, and a second part in contact with an outer side wall of the heat sink and an inner side wall of the front frame, a rear end wall of the second part being abutted against a front end wall of the backboard, and a groove open outwards is arranged on the outer side wall of the heat sink for holding a projection arranged on the second part of the middle frame and protruding inwards, thus forming a positioning connection between the middle frame and the heat sink.

2. The backlight module according to claim 1, wherein the groove is divided into a plurality of parts, not communicated with each other, in a direction parallel to the longitudinal direction of the middle frame.

3. The backlight module according to claim 2, wherein the length of each part of the groove is set to be 1-3 cm.

4. The backlight module according to claim 1, wherein a hook is arranged on the front end wall of the heat sink, and a clamping slot capable of being matched with the hook is arranged on the first part of the middle frame.

5. The backlight module according to claim 4, wherein the hook is completely accommodated in the clamping slot of the middle frame.

6. The backlight module according to claim 1, wherein the first part of the middle frame is connected with the front end wall of the heat sink through a fastening screw.

7. The backlight module according to claim 6, wherein the screw is completely held between the front end face of the first part of the middle frame and the rear end face of the front end wall of the heat sink.

8. A liquid crystal display comprising:
a liquid crystal display panel; and
a backlight module including:
a front frame,
a middle frame,
a backboard having a light guide plate, a heat sink, a quantum dot unit, and a light source, arranged in the backboard, wherein the quantum dot unit is fixed to the backboard by the heat sink between the light guide plate and the backlight, and the middle frame is positioned between the backboard and the front frame, and coupled to the heat sink, the middle frame is T-shaped, and includes a first part in contact with a front end wall of the heat sink and capable of providing support for a display panel, and a second part in contact with an outer side wall of the heat sink and an inner side wall of the front frame, a rear end wall of the second part being abutted against a front end wall of the backboard, and a groove open outwards is arranged on the outer side wall of the heat sink for holding a projection arranged on the second part of the middle frame and protruding inwards, thus forming a positioning connection between the middle frame and the heat sink.

9. The liquid crystal display according to claim 8, wherein the groove is divided into a plurality of parts, not communicated with each other, in a direction parallel to the longitudinal direction of the middle frame.

10. The liquid crystal display according to claim 9, wherein the length of each part of the groove is set to be 1-3 cm.

11. The liquid crystal display according to claim 8, wherein a hook is arranged on the front end wall of the heat sink, and a clamping slot capable of being matched with the hook is arranged on the first part of the middle frame.

12. The liquid crystal display according to claim 11, wherein the hook is completely accommodated in the clamping slot of the middle frame.

13. The liquid crystal display according to claim 8, wherein the first part of the middle frame is connected with the front end wall of the heat sink through a fastening screw.

14. The liquid crystal display according to claim 13, wherein the screw is completely held between the front end face of the first part of the middle frame and the rear end face of the front end wall of the heat sink.

* * * * *